(12) United States Patent
Kasai et al.

(10) Patent No.: US 6,335,838 B1
(45) Date of Patent: Jan. 1, 2002

(54) IMAGE DISPLAY APPARATUS

(75) Inventors: Ichiro Kasai, Kawachinagano; Hideki Nagata, Kobe, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/504,073

(22) Filed: Feb. 15, 2000

(30) Foreign Application Priority Data

Feb. 23, 1999 (JP) .................................. 11-044481
Feb. 23, 1999 (JP) .................................. 11-044488

(51) Int. Cl.[7] .............................. G02B 5/04; G02B 27/14
(52) U.S. Cl. ............................................. 359/834; 359/631
(58) Field of Search ..................................... 359/831, 837, 359/833, 834, 830, 631, 633, 637, 636, 640, 638

(56) References Cited

U.S. PATENT DOCUMENTS

| | | | | |
|---|---|---|---|---|
| 5,596,451 A | * | 1/1997 | Handschy et al. ............ | 359/633 |
| 5,659,430 A | | 8/1997 | Togino ............................ | 359/731 |
| 5,701,202 A | | 12/1997 | Takahashi ...................... | 359/631 |
| 5,771,124 A | * | 6/1998 | Kintz et al. ................... | 359/630 |
| 5,777,794 A | | 7/1998 | Nakaoka ........................ | 359/632 |
| 5,943,171 A | * | 8/1999 | Budd et al. .................... | 359/631 |
| 6,023,253 A | * | 2/2000 | Taniguchi et al. ............... | 345/7 |
| 6,023,373 A | * | 2/2000 | Inoguchi et al. ............. | 359/633 |
| 6,130,784 A | * | 10/2000 | Takahashi ..................... | 359/630 |

* cited by examiner

Primary Examiner—Cassandra Spyrou
Assistant Examiner—Jared Treas
(74) Attorney, Agent, or Firm—Burns, Doane, Swecker & Mathis, LLP

(57) ABSTRACT

In an image display apparatus, between a reflection-type liquid crystal display panel and a light source for supplying illumination light thereto, a half mirror is disposed at an angle. In addition, in the optical path of the light reflected from the liquid crystal display panel and then reflected from the half mirror, a concave mirror is disposed, and, in the optical path of the light reflected from the concave mirror and then transmitted through the half mirror, a polarizing plate is disposed so that, out of the light reflected from the liquid crystal display panel, only the light that conveys an image is directed to an observer's eye. Alternatively, a polarization separation mirror is disposed in place of the half mirror, and a quarter-wave plate is disposed between the polarization separation mirror and the concave mirror instead of using the polarizing plate.

35 Claims, 6 Drawing Sheets

IMAGE DISPLAY APPARATUS

This application is based on applications Nos. H11-044481 and H11-044488 filed in Japan on Feb. 23, 1999, the entire content of which is hereby incorporated by reference.

BACKGROUND OF THE INVENTION

1. Field of the Invention

The present invention relates to an image display apparatus that is, when in use, placed in front of an eye of an observer, and particularly to an image display apparatus that employs a reflection-type liquid crystal display panel to display images.

2. Description of the Prior Art

There is a type of image display apparatus that is, when in use, kept in front of an eye of an observer by being mounted on the head or held with the hand of the observer. Such image display apparatuses are widely used as a means for presenting virtual reality with much realism or as a viewfinder incorporated in an image shooting apparatus such as a video camera. This type of image display apparatus is so constructed that the light of a displayed image is directed through an observation optical system to the eye of the observer so as to present an enlarged virtual image of the displayed image to the observer.

Here, it is desirable that the image be presented to the observer with high brightness, high resolution, and, in particular where virtual reality is presented, a wide angle of view. On the other hand, considering that the apparatus needs to be mounted on the head or held with the hand of the observer, it is highly desirable that the apparatus be made compact and light. These requirements are met by using a liquid crystal display panel, and this is the reason that most image display apparatuses of the type used in front of an observer's eye adopt a liquid crystal display panel.

A liquid crystal display panel has a large number of pixels arranged in a two-dimensional array, and modulates the illumination light shone thereon by performing polarization conversion on the illumination light on a pixel by pixel basis so as to obtain desired intensity distribution of differently polarized light components in the thus converted illumination light. The polarization conversion is controlled pixel by pixel in accordance with an image signal so that different degrees of polarization conversion will be performed for the individual pixels. This produces differences in the amounts of differently polarized light components among the pixels, and directing such light including varying amounts of differently polarized light components to the eye enables the eye to see an image in the form of a pattern of varying brightness.

Liquid crystal display panels are roughly grouped into transmission-type and reflection-type liquid crystal display panels, of which the former receive illumination light from the side opposite to the side from which the image is observed and the latter receive illumination light from the same side from which the image is observed. Reflection-type liquid crystal display panels offer the following advantages as compared with transmission-type liquid crystal display panels. In a liquid crystal display panel, the individual pixels are controlled by circuits such as TFTs (thin-film transistors), which themselves occupy a certain area. Whereas these circuits cannot be arranged without reducing the apertures of the individual pixels in transmission-type liquid crystal display panels, they can be arranged on the face opposite to the side from which the image is observed in reflection-type liquid crystal display panels, which therefore suffer less from loss in aperture ratio due to the arrangement of such circuits and thus offer brighter images.

The difference in aperture ratio between transmission-type and reflection-type liquid crystal display panels becomes more striking as the pixels are made smaller. Accordingly, if the same brightness is aimed at with the same number of pixels, reflection-type liquid crystal display panels can be made more compact. Conversely, if the same size is aimed at, reflection-type liquid crystal display panels can be provided with more pixels, making it possible to present images of higher resolution.

Moreover, reflection-type liquid crystal display panels by nature allow the liquid crystal layer by which they perform polarization conversion to be thinner than in transmission-type liquid crystal display panels. This permits reflection-type liquid crystal display panels to refresh the displayed image faster.

Thus, using a reflection-type liquid crystal display panel having these advantages contributes greatly to obtaining bright and high-resolution images as desired in an image display apparatus used in front of an observer's eye. In addition, the smaller size of the display panel allows the use of a smaller observation optical system and thereby facilitates the miniaturization of the apparatus as a whole.

The observation optical system serves to direct light from the display panel to the observer's eye, and therefore it is desirable that the observation optical system be not only capable of presenting the displayed image to the observer without loss in image quality but also sufficiently compact and light to suit the intended uses. From this perspective, it has been proposed to provide the observation optical system with a reflecting surface having an optical power.

Whereas a refracting surface is associated with the dependency of the angle of refraction on the wavelength, a reflecting surface is free from such wavelength-dependence of the angle of reflection, and thus does not cause chromatic aberration. Moreover, a reflecting surface, despite having a positive power that makes light converge, offers a negative Petzval value, and thus contributes to improving the Petzval sum of the entire optical system, making it possible to almost eliminate image-surface distortion even at the edge so as to present images with excellent flatness. In addition, a reflecting surface allows the optical paths of incident and reflected light to overlap partially, and thus makes it easier to secure a relatively long total optical path. Accordingly, an observation optical system provided with a reflecting surface having an optical power is compact but nevertheless offers a higher magnification and a wider angle of view without any loss in image quality.

Head-mounted display (HMD) apparatuses having an observation optical system provided with a reflecting surface having such advantages are disclosed in U.S. Pat. Nos. 5,777,794, No. 5,701,202, and No. 5,659,430.

As described above, a reflection-type liquid crystal display panel needs to receive illumination light from the side from which the image is observed, and therefore the optical paths of illumination and reflected light overlap. Accordingly, it is necessary to separate the unmodulated illumination light coming from the light source and the modulated reflected light coming from the liquid crystal display panel. However, the HMD apparatuses disclosed in the above-mentioned patents are not so constructed as to allow separation of the illumination and modulated light, and therefore it is impossible to use a reflection-type liquid crystal display panel as a display device therein. For this reason, these HMD apparatuses employ a transmission-type liquid crystal display panel despite its somewhat inferior performance, and therefore, with them, it is impossible to achieve a satisfactory improvement in the quality of the images presented to the observer even though they have an observation optical system provided with a reflecting surface.

On the other hand, an HMD apparatus employing a reflection-type liquid crystal display panel has also been proposed, of which the construction is shown in FIG. 7. In this HMD apparatus, between a reflection-type liquid crystal display panel 101 and a light source 102 for illuminating it, a PBS (polarized-beam separating) mirror 103 is disposed that transmits one and reflects the other of two polarized light components having mutually perpendicular polarization planes. In addition, in the optical path of the light reflected from the liquid crystal display panel 101 and then reflected from the PBS mirror 103, an eyepiece lens 104 is disposed as an observation optical system. The reflected light coming from the liquid crystal display panel 101 is separated from the illumination light coming from the light source 102 by the PBS mirror 103, and is then directed through the eyepiece lens 104 to the observer's eye EP.

In this HMD apparatus, the use of the reflection-type liquid crystal display panel 101 helps display high-quality images. However, since the observation optical system here is composed solely of refracting surfaces, increasing the magnification tends to make the quality of the images presented to the observer poorer, making it difficult to obtain a satisfactorily wide angle of view. Moreover, even though the eyepiece lens 104 serving as the observation optical system is designed to make the best of the reflection-type liquid crystal display panel 101 that excels in high definition, this can be achieved only within a certain limit, and, in particular where there are restrictions on the size, it is simply difficult to design the eyepiece lens to make the best of the reflection-type liquid crystal display panel.

Moreover, in this HMD apparatus, the PBS mirror 103 is used to separate the illumination light and the light reflected from the reflection-type liquid crystal display panel 101 and also to separate the image-conveying and no-image-conveying polarized light components included in the reflected light, but the polarization separation achieved by the PBS mirror 103 is not always perfect. In general, a PBS mirror exhibits varying polarization separation characteristics according to the angle of incidence of the light striking it; specifically, if light strikes it at an angle of incidence outside the designed range, the polarized light component that should be transmitted is partially reflected and the polarized light component that should be reflected is partially transmitted. Moreover, although the illumination light as a whole is directed to the reflection-type liquid crystal display panel from a direction perpendicular thereto, it includes rays that travel obliquely relative to the reflection-type liquid crystal display panel and that thus strike the PBS mirror at angles of incidence outside the designed range. The imperfectness of the polarization separation achieved by the PBS mirror appears in both the separation of the illumination and reflected light and the separation of the image-conveying and other polarized light components included in the reflected light.

As a result of imperfect polarization separation, some light that conveys no image is directed to the observer's eye. This light causes, for example, a ghost, and thereby degrades the quality of the images presented. This greatly devalues the significance of using a reflection-type liquid crystal display panel that itself offers excellent performance.

SUMMARY OF THE INVENTION

An object of the present invention is to provide an image display apparatus that presents images with higher quality than ever despite being sufficiently compact and light to suit the intended uses.

To achieve the above object, according to one aspect of the present invention, an image display apparatus used in front of an observer's eye is provided with: a reflection-type modulation device for modulating illumination light incident thereon in accordance with an image displayed thereon and reflecting back the thus modulated illumination light as image light; a semi-transmissive reflection device for directing the illumination light to the reflection-type modulation device and letting the image light reflected back from the reflection-type modulation device emerge in a direction that is not parallel to the direction from which the semi-transmissive reflection device receives the illumination light; an observation optical system for directing the image light having emerged from the semi-transmissive reflection device to the observer's eye so that a virtual image of the image displayed on the reflection-type modulation device will be presented to the observer; and a separation device disposed in the optical path of the image light between the reflection-type modulation device and the observer so as to separate the light other than the image light from the light directed to the observer's eye.

According to another aspect of the present invention, an image display apparatus used in front of an observer's eye is provided with: a reflection-type modulation device for modulating illumination light incident thereon in accordance with an image displayed thereon and reflecting back the thus modulated illumination light as image light; a semi-transmissive reflection device for directing the illumination light to the reflection-type modulation device and letting the image light reflected back from the reflection-type modulation device emerge in a direction that is not parallel to the direction from which the semi-transmissive reflection device receives the illumination light; and an observation optical system for directing the image light having emerged from the semi-transmissive reflection device to the observer's eye so that a virtual image of the image displayed on the reflection-type modulation device will be presented to the observer. Here, the observation optical system includes a reflecting surface having an optical power.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
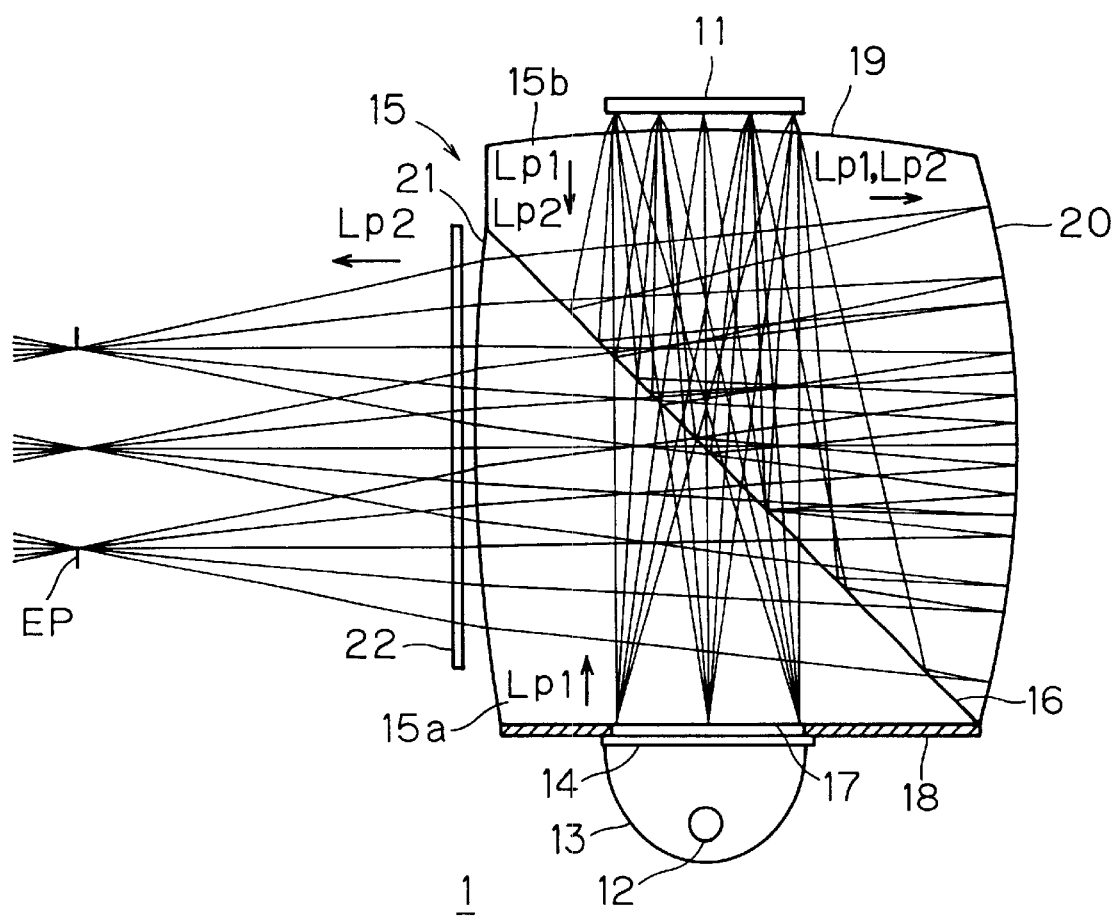
FIG. 1 is a diagram showing the construction of the optical system of the image display apparatus of a first embodiment of the invention.

Hereinafter, image display apparatuses embodying the present invention will be described with reference to the accompanying drawings. FIG. 1 shows the construction of the optical system of the image display apparatus 1 of a first embodiment of the invention. This image display apparatus 1 is provided with a reflection-type liquid crystal display panel 11, a lamp 12, a reflector 13, a polarizing plate 14, a prism 15, and another polarizing plate 22.

The lamp 12, the reflector 13, and the polarizing plate 14 are so arranged as to face the display surface of the liquid crystal display panel 11, and together constitute a light source section for supplying illumination light to the liquid crystal display panel 11. The lamp 12 emits light having random polarization planes, and the reflector 13 reflects the light emitted from the lamp 12 in such a way as to form it into a substantially parallel beam. The polarizing plate 14 transmits only a polarized light component Lp1 having a predetermined polarization plane out of the light emitted from the lamp 12.

The prism 15 is composed of two prisms 15a and 15b, each made of polymethyl methacrylate (PMMA), cemented together, and is disposed between the liquid crystal display panel 11 and the polarizing plate 14. At the cementing interface between the prisms 15a and 15b, a semi-transmissive reflective film is provided that transmits approximately one half and reflects approximately the other half of the light incident thereon, and thus this cementing interface acts as a half mirror 16. The prism 15 is arranged with the half mirror 16 kept at 45° relative to the line that goes through the center of the display surface of the liquid crystal display panel 11 perpendicularly to the display surface.

At the surface 17 of the prism 15a that lies close to the polarizing plate 14, an aperture stop 18 is provided so as to be kept in contact with that surface 17, and thus the polarizing plate 14 faces the prism 15 through the opening of the aperture stop 18. The aperture stop 18 serves to prevent external light from mixing with the illumination light for illuminating the liquid crystal display panel 11.

The surface 19 of the prism 15b that lies close to the liquid crystal display panel 11 is formed into a convex surface. This surface 19 acts as a condenser lens toward the illumination light, and thus serves to make the angle of the illumination light relative to the display surface of the liquid crystal display panel 11 closer to a right angle. The surface 20 of the prism 15b next to the surface 19 thereof is also formed into a convex surface. Over this surface 20, a totally reflective film is formed. Accordingly, the surface 20 of the prism 15b acts as a total-reflection concave mirror toward the light coming from the half mirror 16, and serves to make the light reflected therefrom converge.

The surface 21 of the prism 15a that lies opposite to the concave mirror 20 is also formed into a convex surface, and thus acts as a convex lens toward the light that passes therethrough. The polarizing plate 22 is disposed perpendicularly to the display surface of the liquid crystal display panel and close to the surface 21. This polarizing plate 22 is designed to transmit only a polarized light component Lp2 that has a polarization plane perpendicular to the polarization plane of the polarized light component Lp1 transmitted through the polarizing plate 14.

The liquid crystal display panel 11 is driven by a driving circuit (not shown). The liquid crystal display panel 11 reflects the illumination light shone thereon and simultaneously modulates the illumination light in accordance with the image displayed thereon by rotating the polarization plane of part of the reflected light through 90. In the image display apparatus 1, the liquid crystal display panel 11 is controlled in such a way that the polarized light component whose polarization plane has been rotated through 90° conveys the image. Accordingly, out of the light reflected from the liquid crystal display panel 11, the light that conveys the image is the polarized light component Lp2 that has a polarization plane perpendicular to the polarization plane of the polarized light component Lp1 transmitted through the polarizing plate 14.

When in use, the image display apparatus 1 is placed in front of an observer's eye with a predetermined distance kept between the pupil EP of the observer and the polarizing plate 22. The light emitted from the lamp 12 is converted by the polarizing plate 14 so as to include only the polarized light component Lp1, and then, passing through the surface 17, strikes the half mirror 16. One half of the light that has struck the half mirror 16 is transmitted therethrough, then passes through the convex surface 19, and eventually illuminates the liquid crystal display panel 11.

Part of the light modulated by and reflected from the liquid crystal display panel 11 is converted into the polarized light component Lp2 that conveys the image and the rest remains the polarized light component Lp1. The light from the liquid crystal display panel 11, including both the polarized light components Lp1 and Lp2, passes through the convex surface 19, and then strikes the half mirror 16 again, which reflects one half of this light. The light reflected from the half mirror 16 then strikes the concave mirror 20, and is totally reflected therefrom so as to strike, as a convergent beam, the half mirror 16 again. One half of this light is transmitted through the half mirror 16, then passes through the convex surface 21, and then, as a more convergent beam, enters the polarizing plate 22.

Out of the light that has entered the polarizing plate 22, the polarized light component Lp1 is blocked, and only the polarized light component Lp2 conveying the image is transmitted through the polarizing plate 22 and reaches the pupil EP of the observer. In this way, an enlarged virtual image of the image displayed on the liquid crystal display panel 11 is presented to the observer. The surfaces 17 and 19 of the prism 15 constitute an illumination optical system for directing the illumination light from the light source section to the liquid crystal display panel 11. On the other hand, the surfaces 20 and 21 of the prism 15 constitute an observation optical system for directing the light reflected from the liquid crystal display panel 11 to the observer's eye so as to present an enlarged virtual image of the displayed image. The optical paths of the illumination and reflected light overlap between the half mirror 16 and the liquid crystal display panel 11, and the separation of the illumination and reflected light is achieved by the half mirror 16.

One half of the illumination light from the light source section is reflected by the half mirror 16, and thus mixes with the light reflected from the liquid crystal display panel 11. However, since the illumination light is the polarized light component Lp1, it is totally blocked by the polarizing plate 22 and is thereby prevented from reaching the pupil EP. As a result, it is possible to present clear, ghost-free images to the observer.

The optical system of the image display apparatus 1 is built as a centered optical system having all of its constituent elements arranged so as to be rotation-symmetric with respect to the optical axis. A practical example of the construction data of this optical system is shown in Tables 1 and 2. In Table 1, for each rotation-symmetric a spherical surface, parameters K, A, B, C, D, E, and F are given that are used to define, assuming that the intersection between the surface and its optical axis is the origin and that the optical axis is the Z axis, the sag Z (in mm) in the Z direction, which is given by formula (1) below.

$$Z = c \cdot h^2 / \left[1 + \{1 - (1+K) \cdot c^2 \cdot h^2\}^{1/2}\right] + A \cdot h^4 + B \cdot h^6 + C \cdot h^8 + D \cdot h^{10} + E \cdot h^{12} + F \cdot h^{14} \quad (1)$$

where $h = (X^{2+y^2})^{1/2}$, and c represents the reciprocal of the radius of curvature (1/r).

Table 2 shows the relative position of each surface, assuming that the center of the pupil EP is the origin and that the axis perpendicular to the plane of the pupil (the first surface) is the Z axis, with XSC, YSC, and ZSC representing the X, Y, and Z coordinates (in mm) of the intersection between the surface and its optical axis and ASC, BSC, and CSC representing the rotation angles (in °) of the surface about the X, Y, and Z axis relative to the plane of the pupil.

In the image display apparatus 1, the image displayed on the liquid crystal display panel 11 is presented as a virtual image mainly enlarged by the concave mirror 20 and thus almost free from chromatic aberration. Moreover, the provision of the concave mirror 20 in the observation optical system allows the optical path of the light reflected from the liquid crystal display panel 11 to overlap between the half mirror 16 and the concave mirror 20, and thereby helps make the optical system as a whole compact. This construction is made possible by the provision of the polarizing plate 22, which makes it possible to tolerate the illumination light mixing with the reflected light.

The image display apparatus 1 having the above-described construction can be used, for example, in a pair to produce a head-mounted display (HMD) apparatus or a hand-held binocular apparatus, or singly as a viewfinder to be incorporated in an image shooting apparatus, such as a video camera, that converts images shot into an electric signal.

In this embodiment, the illumination light is transmitted through the half mirror 16 so as to be directed to the liquid crystal display panel 11 and the reflected light from the liquid crystal display panel 11 is reflected from the half mirror 16 so as to be directed to the observation optical system. However, the entire optical system may be constructed the other way around so that the illumination light is reflected from the half mirror 16 so as to be directed to the liquid crystal display panel 11 and the reflected light from the liquid crystal display panel 11 is transmitted through the half mirror 16 so as to be directed to the observation optical system. In that case, for example, the concave mirror 20 is provided on that side of the prism 15a which is opposite to the liquid crystal display panel 11, and the aperture stop 18 and the light source section are provided on that side of the prism 15b which is opposite to the polarizing plate 22.

It is also possible to construct the observation optical system using solely lenses instead of using the concave mirror 20. For example, the surface 20 of the prism 15b is formed not into a totally reflective surface but into a totally transmissive surface having an adequate positive power, and the polarizing plate 22 is disposed close to this surface. Alternatively, it is also possible to form the surface 20 into a totally transmissive flat surface and provide separately a lens having a positive power.

Figure 2:
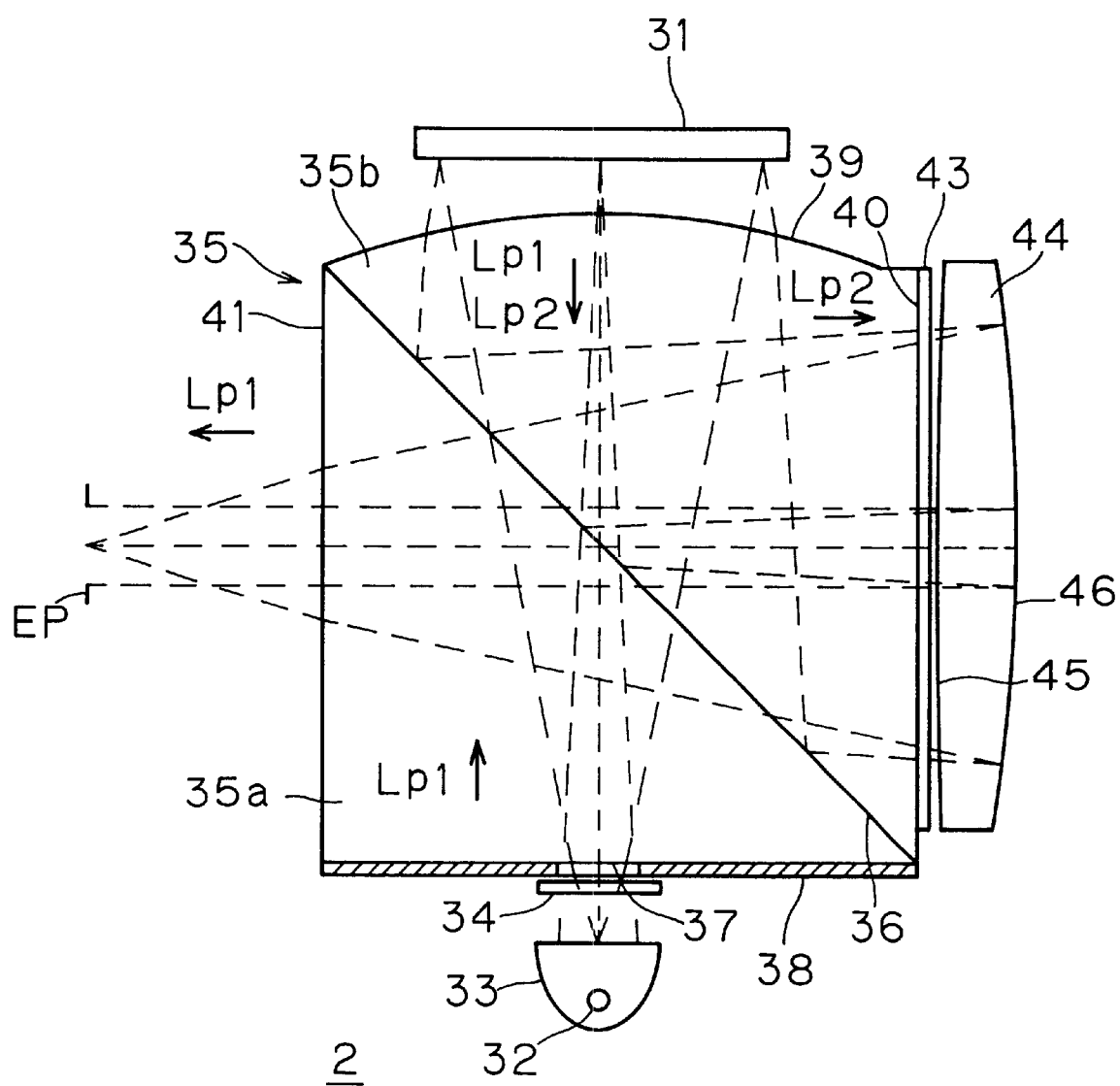
FIG. 2 is a diagram showing the construction of the optical system of the image display apparatus of a second embodiment of the invention.

FIG. 2 shows the construction of the optical system of the image display apparatus 2 of a second embodiment of the invention. This image display apparatus 2 is provided with a reflection-type liquid crystal display panel 31, a lamp 32, a reflector 33, a polarizing plate 34, a prism 35, and a plate-like element 44.

The lamp 32, the reflector 33, and the polarizing plate 34 are so arranged as to face the display surface of the liquid crystal display panel 31, and together constitute a light source section for supplying illumination light to the liquid crystal display panel 31. The lamp 32 emits light having random polarization planes, and the reflector 33 reflects the light emitted from the lamp 32. The polarizing plate 34 transmits only a polarized light component Lp1 having a predetermined polarization plane out of the light emitted from the lamp 32.

The prism 35 is composed of two prisms 35a and 35b, each made of PMMA, cemented together, and is disposed between the liquid crystal display panel 31 and the polarizing plate 34. At the cementing interface between the prisms 35a and 35b, a semi-transmissive reflective film is provided that transmits P-polarized light and reflects S-polarized light, and thus this cementing interface acts as a PBS (polarized beam separating) mirror 36. The prism 35 is arranged with the PBS mirror 36 kept at 45° relative to the line that goes through the center of the display surface of the liquid crystal display panel 31 perpendicularly to the display surface.

On the surface 37 of the prism 35a that lies close to the polarizing plate 34, an aperture stop 38 is provided so as to shield external light, and thus the polarizing plate 34 faces the prism 35 through the opening of the aperture stop 38. The surface 39 of the prism 35b that lies close to the liquid crystal display panel 31 is formed into a convex surface so as to act as a condenser lens toward the illumination light. The surface 40 of the prism 35b next to the surface 39 thereof is formed into a flat surface, on which a ¼λ-phase plate 43 is provided. The surface 41 of the prism 35a that lies opposite to the surface 40 is also formed into a flat surface.

The plate-like element 44 is, like the prism 35, made of PMMA, and is disposed close to the surface 40 of the prism 35b on which the ¼λ-phase plate 43 is provided. The surface 45 of the plate-like element 44 facing the ¼λ-phase plate 43 is formed into a convex surface so as to act as a convex lens toward the light passing therethrough. The surface 46 opposite to the surface 45 is also formed into a convex surface, and, over this surface 46, a totally reflective film is formed. Accordingly, the surface 46 acts as a totally reflective concave mirror toward the light coming from the ¼λ-phase plate 43, and thus serves to make the light reflected therefrom converge.

The polarizing plate 34 is so designed that the polarized light component Lp1 that transmits therethrough is P-polarized with respect to the PBS mirror 36. The liquid crystal display panel 31 is so controlled that the polarized light component whose polarization plane has been rotated through 90° conveys the image.

The light emitted from the lamp 32 is converted by the polarizing plate 34 so as to include only the polarized light component Lp1, and then, passing through the surface 37, strikes the PBS mirror 36. All of this light is transmitted through the PBS mirror 36, then passes through the convex surface 39, and eventually illuminates the liquid crystal display panel 31.

Part of the light modulated by and reflected from the liquid crystal display panel 31 is converted into the polarized light component Lp2 that conveys the image and the rest remains the polarized light component Lp1. The light reflected from the liquid crystal display panel 31, including both the polarized light components Lp1 and Lp2, passes through the convex surface 39, and then strikes the PBS mirror 36 again, which transmits the polarized light component Lp1 and reflects the polarized light component Lp2, which is S-polarized with respect to the PBS mirror 36.

The light reflected from the PBS mirror 36 enters the plate-like element 44, is then reflected from the concave mirror 46, and then strikes, as a convergent beam, the PBS mirror 36 again. Meanwhile, the light passes through the ¼λ-phase plate 43 twice, and thus has its polarization plane rotated through 90° and is thereby converted back into P-polarized light with respect to the PBS mirror 36. This light is transmitted through the PBS mirror 36, then passes through the surface 41, and then reaches the pupil EP of the observer. In this way, an enlarged virtual image of the image displayed on the liquid crystal display panel 31 is presented to the observer.

In the image display apparatus 2 of this embodiment, the two surfaces 45 and 46 of the plate-like element 44 constitute an observation optical system. The PBS mirror 36 serves, on the one hand, to separate the illumination light coming from the light source section and the reflected light coming from the liquid crystal display panel 31 and, on the other hand, to separate the image-conveying and other light included in the reflected light coming from the liquid crystal display panel 31. Since no part of the illumination light is reflected from the PBS mirror 36 and no part of the image-conveying light is transmitted through the PBS mirror 36, the image display apparatus 2 permits efficient use of light without loss thereof and thus offers very bright images.

In this embodiment, the illumination light is transmitted through the PBS mirror 36 so as to be directed to the liquid crystal display panel 31 and the reflected light from the liquid crystal display panel 31 is reflected from the PBS mirror 36 so as to be directed to the observation optical system. However, the entire optical system may be constructed the other way around so that the illumination light is reflected from the PBS mirror 36 so as to be directed to the liquid crystal display panel 31 and the reflected light from the liquid crystal display panel 31 is transmitted through the PBS mirror 36 so as to be directed to the observation optical system. In that case, for example, the ¼λ-phase plate 43, together with the concave mirror 46, is provided on that side of the prism 35a which is opposite to the liquid crystal display panel 31, and the aperture stop 38 and the light source section are provided on that side of the prism 35b which is opposite to the pupil EP; in addition, the PBS mirror 36 is designed to reflect P-polarized light and transmit S-polarized light.

It is also possible to construct the observation optical system using solely lenses instead of using the concave mirror 46. For example, the surface 46 of the plate-like element 44 is formed not into a totally reflective surface but into a totally transmissive surface having an adequate positive power. In this case, there is no need to provide the ¼λ-phase plate 43. Moreover, even if the illumination light from the light source section includes the polarized light component Lp2, which is the same component as that conveying the image, all of this polarized light component Lp2 is reflected by the PBS mirror 36 in the direction opposite to the pupil EP, and therefore there is no need to provide the polarizing plate 34, either.

Figure 3:
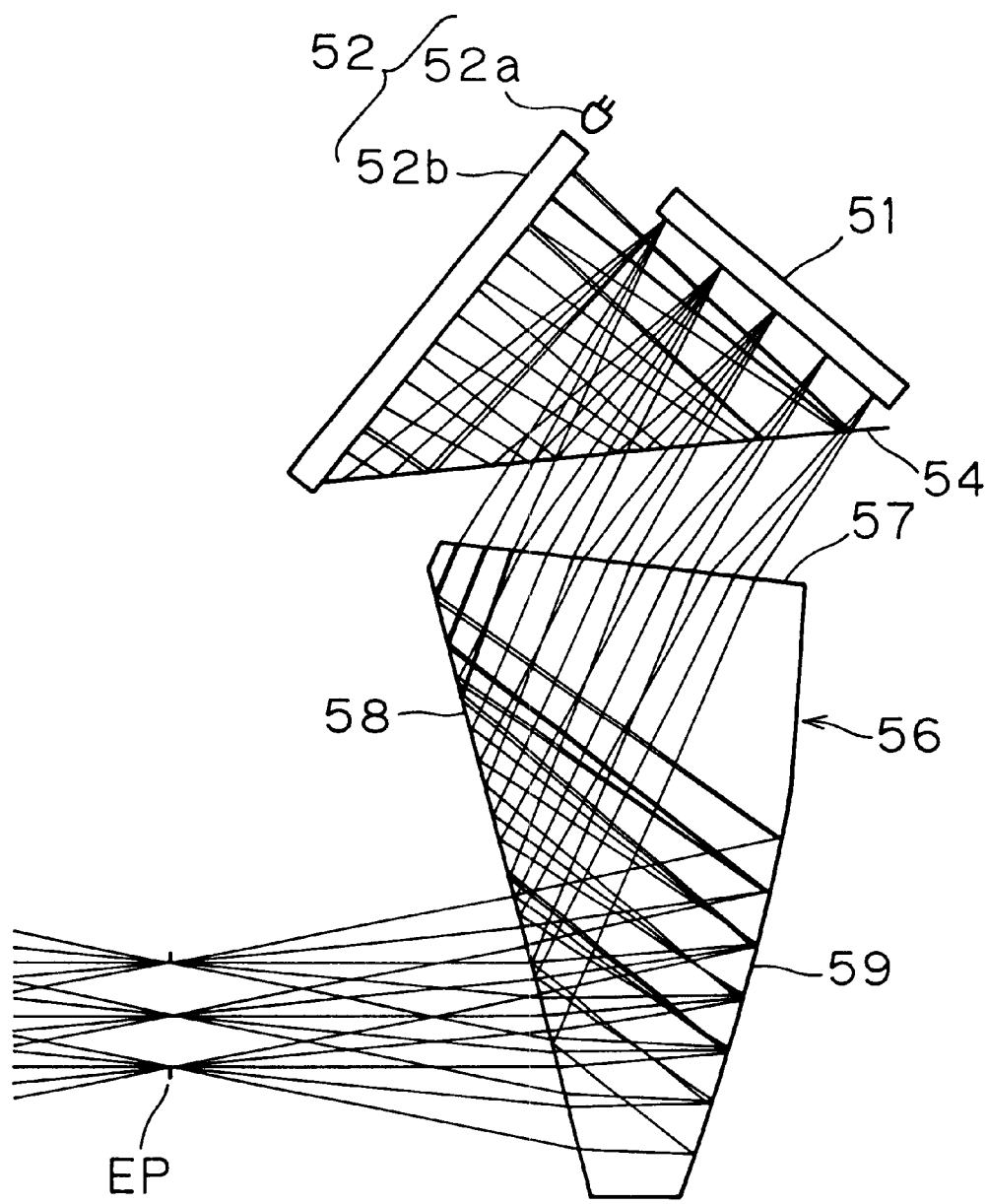
FIG. 3 is a diagram showing the construction of the optical system of the image display apparatus of a third embodiment of the invention.

FIG. 3 shows the construction of the optical system of the image display apparatus 3 of a third embodiment of the invention. This image display apparatus 3 is provided with a reflection-type liquid crystal display panel 51, a light source section 52, a PBS mirror 54, and a prism 56.

The light source section 52 is composed of a plurality of lamps 52a arranged in a straight line and a light guide plate 52b, and supplies illumination light for illuminating the liquid crystal display panel 51. The lamps 52a emit light having random polarization planes. The light guide plate 52b is composed of a large number of minute, columnar triangular prisms arranged so as to form a flat plate. The linear light from the lamps 52a is shone into the light guide plate 52b through a side surface thereof, and is reflected by those prisms so as to be formed into a beam having a sufficiently large diameter to illuminate the entire display surface of the liquid crystal display panel 51.

The PBS mirror 54, on the one hand, reflects the light from the light guide plate so as to direct it to the liquid crystal display panel 51 and, on the other hand, transmits the image-conveying light included in the reflected light from the liquid crystal display panel 51 so as to direct it to the prism 56. The PBS mirror 54 is designed to transmit the polarized light component that strikes it as P-polarized light and reflect the polarized light component that strikes it as S-polarized light. Out of the light from the light guide plate 52b, only the polarized light component that is S-polarized with respect to the PBS mirror 54 is reflected therefrom so as to be directed to the liquid crystal display panel 51, and the polarized light component that is P-polarized is transmitted therethrough so as to be discarded.

The liquid crystal display panel 51 reflects the illumination light shone thereon, and simultaneously modulates the illumination light in accordance with the image displayed thereon so that the polarization plane of part of the reflected light will be rotated through 90°. In the image display apparatus 3, the liquid crystal display panel 51 is controlled in such a way that the polarized light component whose polarization plane has been rotated through 90° conveys the image. Accordingly, the image-conveying light included in the light reflected from the liquid crystal display panel 51 has been converted into P-polarized light with respect to the PBS mirror 54, and is thus transmitted through the PBS mirror 54. On the other hand, the rest of the light reflected from the liquid crystal display panel 51, whose polarization plane has not been rotated, remains S-polarized light with respect to the PBS mirror 54, and is thus reflected therefrom so as to be discarded.

The prism 56 is made of PMMA. The prism 56 receives the reflected light from the liquid crystal display panel 51 through the PBS mirror 54, and directs the received light to the pupil EP of the observer. To achieve this, three surfaces 57, 58, and 59 of the prism 56 are used. The surface 57 is formed into a flat surface, and is designed to totally transmit the light from the PBS mirror 54. The surface 58 is also formed into a flat surface, but is so designed that the light having passed through the surface 57 is incident thereon at angles of incidence greater than the critical angle. Thus, the light having passed through the surface 57 is totally reflected by the surface 58.

The surface 59 is formed into an anamorphic aspherical convex surface that is non-rotation-symmetric with respect to the optical axis. Over this surface 59, a totally reflective film is formed, and thus the surface 59 acts as a concave mirror having a positive power toward the light coming from the surface 58. The surface 59 is designed to receive the light that has been totally reflected from the surface 58 and reflect it in such a way that it then strikes the surface 58 again at angles of incidence smaller than the critical angle. Thus, the light incident on the surface 59 is reflected therefrom at angles of reflection different from the angles of incidence so as to pass through the surface 58 and then, as a convergent beam, reach the pupil EP of the observer.

The observer, by looking at the display surface of the liquid crystal display panel 51 through the surface 59, observes an enlarged virtual image of the displayed image. The three surfaces 57, 58, and 59 of the prism 56 constitute an observation optical system for directing the light reflected from the liquid crystal display panel 51 and then separated from the illumination light to the pupil EP so as to present a virtual image of the displayed image to the observer. Of these surfaces, the surface 58 acts as a selectively reflecting surface that either transmits or reflects light according to the direction from which the light is incident thereon.

As described above, the image display apparatus 3 adopts an observation optical system that is built as a non-centered optical system, and this helps make the apparatus as a whole slim, i.e. compact in the direction of the line of sight of the observer.

Figure 4:
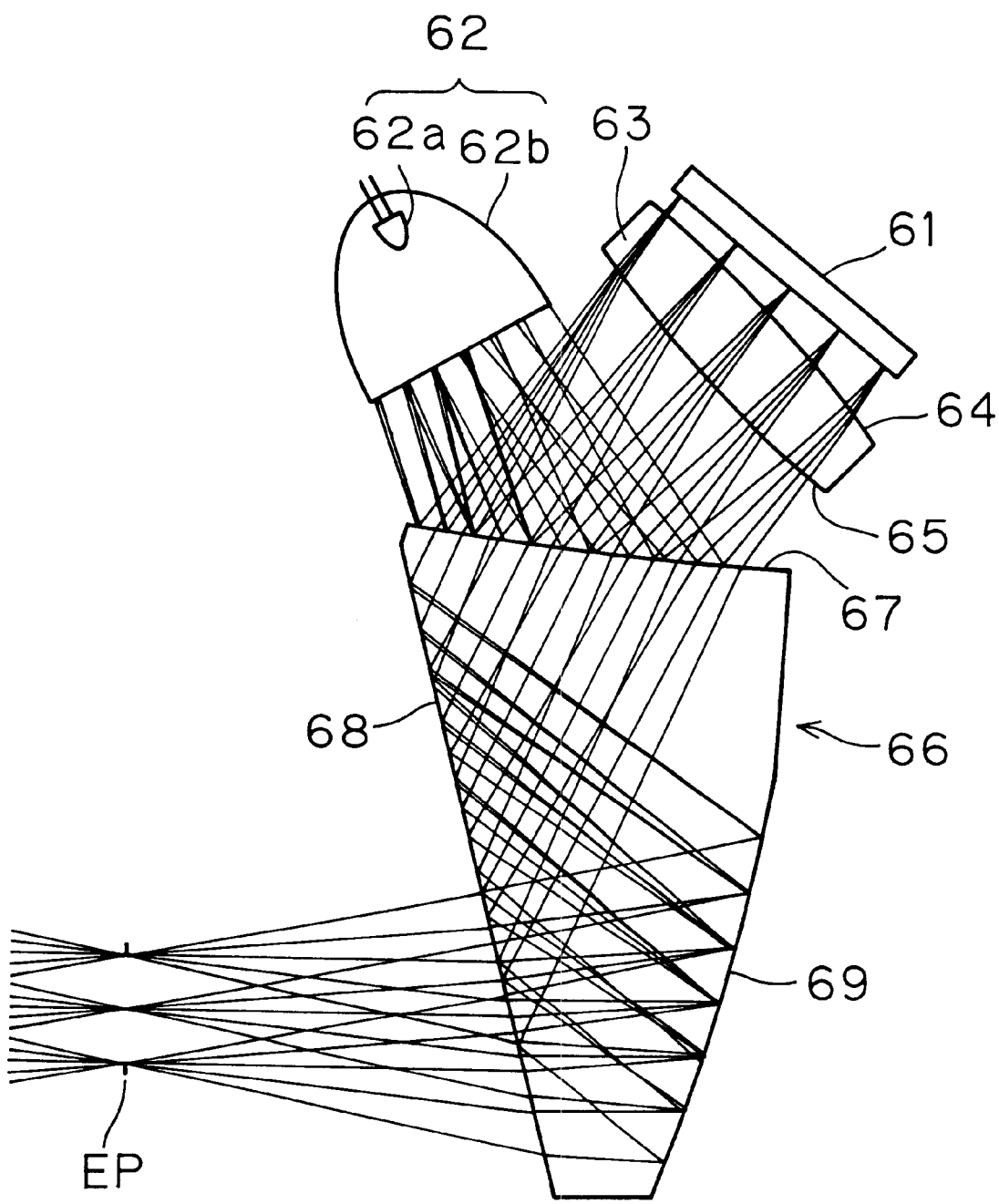
FIG. 4 is a diagram showing the construction of the optical system of the image display apparatus of a fourth embodiment of the invention.

FIG. 4 shows the construction of the optical system of the image display apparatus 4 of a fourth embodiment of the invention. This image display apparatus 4 is provided with a reflection-type liquid crystal display panel 61, a light source section 62, a condenser lens 63, and a prism 66. The light source section 62 is composed of a lamp 62a for supplying illumination light to the liquid crystal display panel 61 and a reflector 62b for reflecting the light emitted from the lamp 62a. The condenser lens 63 has two convex surfaces 64 and 65, and serves to form the illumination light from the light source section 62 into a substantially parallel beam and direct it to the liquid crystal display panel 61.

The prism 66 is made of PMMA, and three surfaces 67, 68, and 69 thereof are involved in the determination of the optical path. The surface 67 is formed into an anamorphic aspherical concave surface so as to act as a PBS mirror that transmits P-polarized light and reflects S-polarized light. Out of the light emitted from the light source section 62 and having random polarized planes, the polarized light component that is P-polarized with respect to the PBS mirror 67 is transmitted therethrough so as to be discarded, and the polarized light component that is S-polarized with respect to the PBS mirror 67 is reflected therefrom so as to be directed to the condenser lens 63. The light emitted from the light source section 62 is a divergent beam, but it is formed into a less divergent beam by the PBS mirror 67 having a concave surface, is then formed into a substantially parallel beam by the condenser lens, and then strikes the liquid crystal display panel 61.

Also in the image display apparatus 4, the liquid crystal display panel 61 is controlled in such a way that the polarized light component whose polarization plane has been rotated through 900 conveys the image. The light reflected from the liquid crystal display panel 61 passes through the condenser lens 63, and then strikes the PBS mirror 67 again. Here, the image-conveying light included in the light striking the PBS mirror 67 has been converted into P-polarized light with respect to the PBS mirror 67, and is thus transmitted therethrough so as to be directed to the surface 68. On the other hand, the rest of the light, whose polarization plane has not been rotated by modulation, remains S-polarized light with respect to the PBS mirror 67, and is thus reflected therefrom so as to be discarded.

The surface 68 is also formed into an anamorphic aspherical concave surface. The surface 68 is so designed that the light reflected from the liquid crystal display panel 61 and then transmitted through the PBS mirror 67 is incident thereon at angles of incidence greater than the critical angle.

Thus, the light transmitted through the PBS mirror 67 is totally reflected from the surface 68.

The surface 69 is formed into an anamorphic aspherical convex surface. Over this surface 69, a totally reflective film is formed, and thus the surface 69 acts as a concave mirror having a positive power toward the light coming from the surface 68. The surface 69 is designed to receive the light that has been totally reflected from the surface 68 and reflect it in such a way that it then strikes the surface 68 again at angles of incidence smaller than the critical angle. Thus, the light incident on the surface 69 is reflected therefrom at angles of reflection different from the angles of incidence so as to pass through the surface 68 and then, as a convergent beam, reach the pupil EP of the observer.

In the image display apparatus 4, the surface (PBS mirror) 67 provided on the prism 66 acts as a semi-transmissive reflective element that serves to separate the illumination light and the reflected light coming from the liquid crystal display panel 61. The three surfaces 67, 68, and 69 of the prism 66 constitute an observation optical system for directing the reflected and then separated light to the pupil EP so as to present a virtual image of the displayed image to the observer. Thus, the surface 67 acts as a semi-transmissive reflective element for achieving separation and simultaneously serves as part of the observation optical system.

In the image display apparatus 4, the provision of the condenser lens 63 permits the light source section 62 and the pupil EP to be located substantially in mutually conjugate positions. This eliminates the need to provide a light guide plate 52b as is used in the image display apparatus 3 of the third embodiment, and allows the light source section 62 to be composed of as few as two elements, i.e. the lamp 62a serving as a point light source and the reflector 62b.

A practical example of the construction data of the optical system of the image display apparatus 4 is shown in Tables 3 and 4.

In Table 3, for each anamorphic aspherical surface, relevant parameters are given that are used to define, assuming that the intersection between the surface and its optical axis is the origin and that the optical axis is the Z axis, the sag Z (in mm) in the Z direction, which is given by formula (2) below. RDX represents the radius of curvature in the X direction.

$$Z = (CUX \cdot X^2 + CUY \cdot Y^2) / \qquad (2)$$

$$[1 + \{1 - (1 + KX) \cdot CUX^2 \cdot X^2 - (1 + KY) \cdot CUY^2 \cdot Y^2\}^{1/2}] +$$

$$AR \cdot \{(1 - AP) \cdot X^2 + (1 + AP) \cdot Y^2\}^2 +$$

$$BR \cdot \{(1 - BP) \cdot X^2 + (1 + BP) \cdot Y^2\}^3 +$$

$$CR \cdot \{(1 - CP) \cdot X^2 + (1 + CP) \cdot Y^2\}^4 +$$

$$DR \cdot \{(1 - DP) \cdot X^2 + (1 + DP) \cdot Y^2\}^5$$

where CUX and CUY represent the reciprocal of the radius of curvature in the X and Y directions, respectively.

Table 4 shows the relative position of each surface, assuming that the center of the pupil EP is the origin and that the axis perpendicular to the plane of the pupil (the first surface) is the Z axis, with XSC, YSC, and ZSC representing the X, Y, and Z coordinates (in mm) of the intersection between the surface and its optical axis and ASC, BSC, and CSC representing the rotation angles (in °) of the surface about the X, Y, and Z axis relative to the plane of the pupil.

Figure 5:
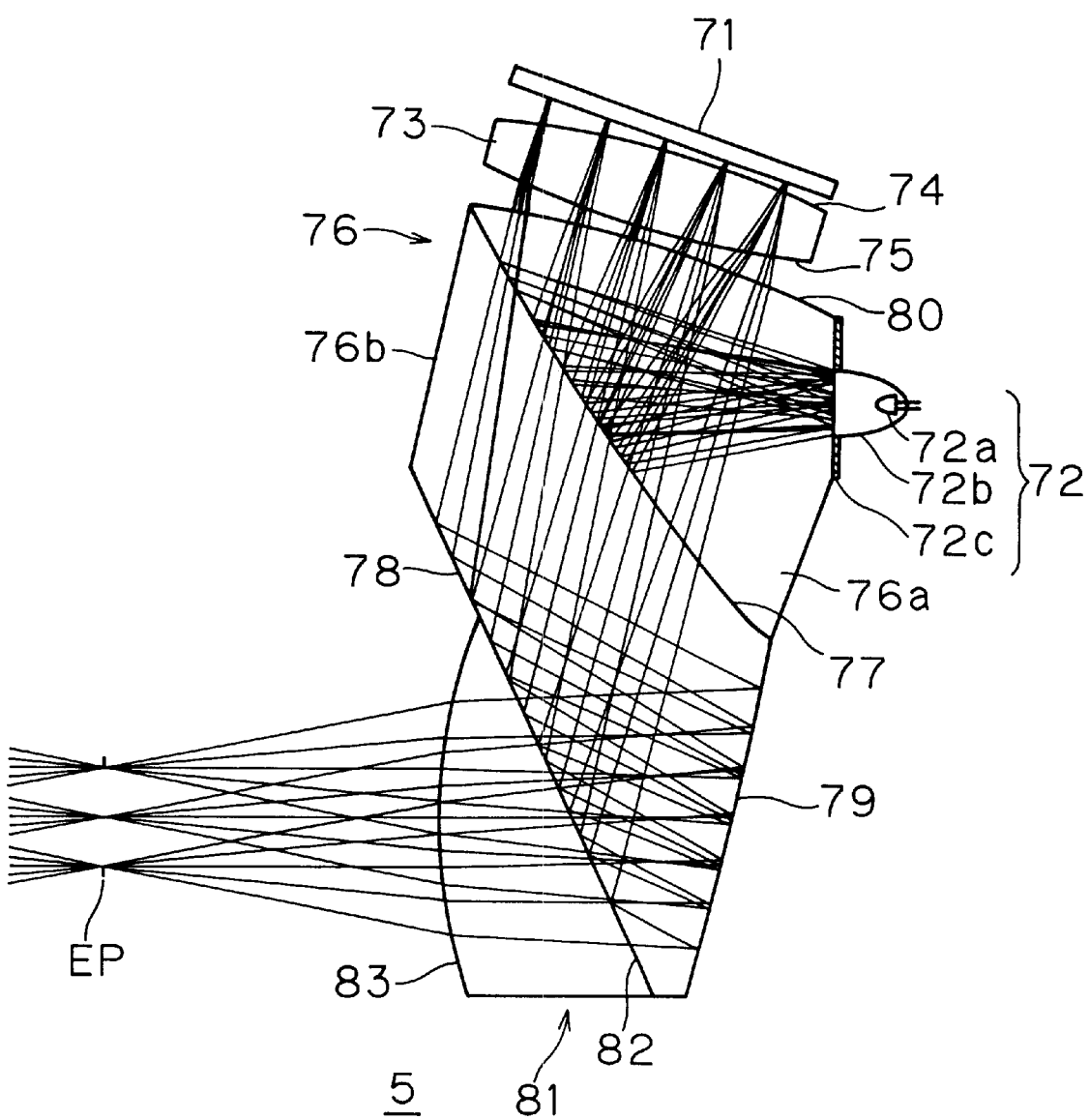
FIG. 5 is a diagram showing the construction of the optical system of the image display apparatus of a fifth embodiment of the invention.

FIG. 5 shows the construction of the optical system of the image display apparatus 5 of a fifth embodiment of the invention. This image display apparatus 5 is provided with a reflection-type liquid crystal display panel 71, a light source section 72, a condenser lens 73, a prism 76, and a prism 81. The light source section 72 is composed of a lamp 72a for emitting illumination light to be supplied to the liquid crystal display panel 71, a reflector 72b for reflecting the light emitted from the lamp 72a, and an aperture stop 72c for restricting the diameter of the light beam, and is disposed close to the prism 76. The condenser lens 73 has two convex surfaces 74 and 75, and serves to form the illumination light emitted from the light source section 72 into a substantially parallel beam and direct it to the liquid crystal display panel 71.

The prism 76 is composed of two prisms 76a and 76b, each made of PMMA, cemented together. The cementing interface between the prisms 76a and 76b, is formed into a curved surface that acts as a PBS mirror that transmits P-polarized light and reflects S-polarized light. In addition to this surface 77, three more surfaces 78, 79, and 80 of the prism 76 are involved in the determination of the optical path. The surface 78 is formed into a flat surface, and the surface 80 is formed into a convex surface. The surface 79 is formed into an anamorphic aspherical convex surface, and, over this surface 79, a totally reflective film is formed. Accordingly, the surface 79 acts as a concave mirror having a positive power toward the light coming from the surface 78.

The prism 81 is also made of PMMA. The prism 81 has a flat surface 82 and a convex surface 83, and is disposed with its surface 82 facing part of the surface 78 of the prism 76b. The surfaces 78 and 82 are parallel to each other. Between the surfaces 78 and 82, a very narrow gap, measuring tens of micrometers or below, is formed, and the surfaces 78 and 82 constitute a TIR (total internal reflection) surface.

The illumination light emitted from the light source section 72 strikes the PBS mirror 77. Here, the polarized light component that is P-polarized with respect to the PBS mirror 77 is transmitted therethrough so as to be discarded, and the polarized light component that is S-polarized with respect to the PBS mirror 77 is reflected therefrom so as to be directed through the surface 80 to the condenser lens 73. The light emitted from the light source section 72 is a divergent beam, but it is formed into a less divergent beam by the PBS mirror 77 having a concave surface and by the convex surface 80, is then formed into a substantially parallel beam by the condenser lens 73, and then strikes the liquid crystal display panel 71.

Also in the image display apparatus 5, the liquid crystal display panel 71 is controlled in such a way that the polarized light component whose polarization plane has been rotated through 90° conveys the image. The light reflected from the liquid crystal display panel 71 passes through the condenser lens 73 and the surface 80, and then strikes the PBS mirror 77 again. Here, the image-conveying light included in the light striking the PBS mirror 77 has been converted into P-polarized light with respect to the PBS mirror 77, and is thus transmitted therethrough so as to be directed to the surface 78. On the other hand, the rest of the light, whose polarization plane has not been rotated by modulation, remains S-polarized light with respect to the PBS mirror 77, and is thus reflected therefrom so as to be discarded.

The surface 78 is so designed that the light reflected from the liquid crystal display panel 71 and then transmitted through the PBS mirror 77 is incident thereon at angles of incidence greater than the critical angle. Thus, the light transmitted through the PBS mirror 77 is totally reflected from the surface 78. As described previously, the prism 81 faces part of the surface 78. However, air exists between the surfaces 78 and 82, and thus the light coming from the PBS mirror 77 is totally reflected from the surface 78, in any area thereon.

The surface 79 is designed to receive the light that has been totally reflected from the surface 78 and reflect it in such a way that it then strikes the surface 78 again at angles of incidence smaller than the critical angle. Thus, the light incident on the surface 79 is reflected therefrom at angles of reflection different from the angles of incidence so as to pass, as a convergent beam, through the surface 78 and then through the surface 82. This light then passes through the surface 83 acting as a convex lens, and then, as a more convergent beam, reaches the pupil EP of the observer.

In the image display apparatus 5, the surface (PBS mirror) 77 provided in the prism 76 acts as a semi-transmissive reflective element that serves to separate the illumination light and the reflected light coming from the liquid crystal display panel 71. The two surfaces 78 and 79 of the prism 76 and the surface 83 of the prism 81 constitute an observation optical system for directing the reflected and then separated light to the pupil EP so as to present a virtual image of the displayed image to the observer. The light source section 72 and the pupil EP are located substantially in mutually conjugate positions.

A practical example of the construction data of the optical system of the image display apparatus 5 is shown in Tables 5 and 6.

In Table 5, for the anamorphic aspherical surface, relevant parameters are given that are used in formula (2) noted earlier. The parameters used in Table 6 are as defined earlier. Moreover, in Table 5, for the rotation-symmetric aspherical surface, relevant parameters are given that are used in formula (1) noted earlier.

In the image display apparatus 5, combining the surface 82 and the surface 78 so as to form the TIR surface permits all of the light having passed through the surface 78 to travel straight. Accordingly, it is possible to reduce the inclination of the concave mirror 79, which needs to be arranged with an inclination relative to the surface 78 to allow the light totally reflected from the surface 78 to strike the surface 78 again at angles of incidence smaller than the critical angle. This helps reduce the amount of decentering of the concave mirror 79 and thereby suppress aberrations resulting from decentering.

Moreover, the provision of the convex lens surface 83 in addition to the concave mirror 79 allows the power needed to make the light reflected from the liquid crystal display panel 71 converge to be shared between those two elements. This helps reduce the curvature of the concave mirror surface 79 and thereby further reduce aberrations resulting from decentering.

Moreover, the placement of the surface 83 having a positive power near the pupil EP makes it easy to secure the eye point.

Figure 6:
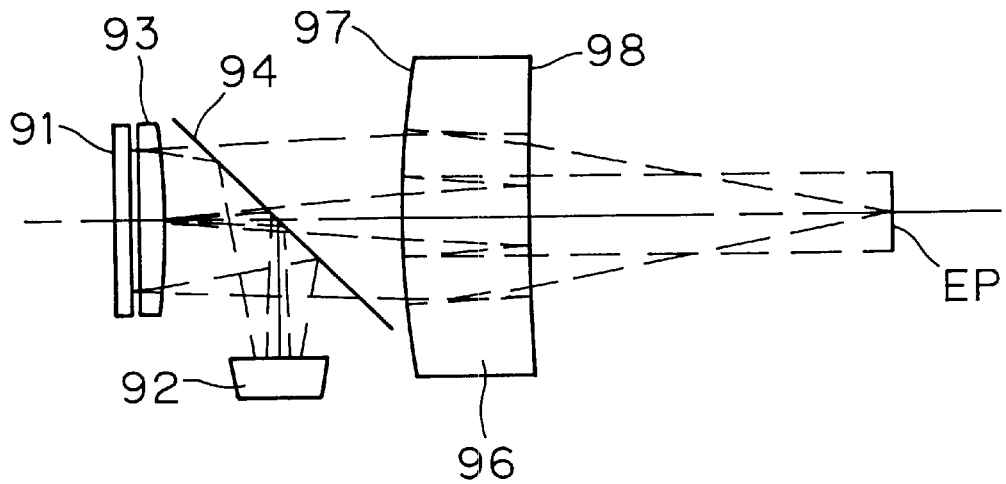
FIG. 6 is a diagram showing the construction of the optical system of the image display apparatus of a sixth embodiment of the invention.
Figure 7:
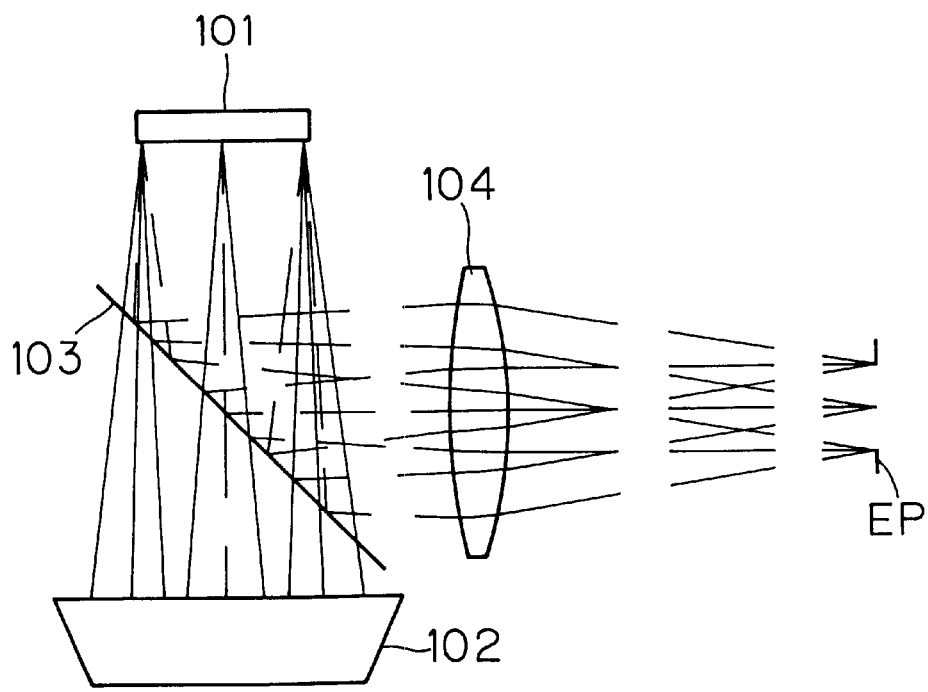
FIG. 7 is diagram showing the construction of the optical system of a conventional image display apparatus.

FIG. 6 shows the construction of the optical system of the image display apparatus 6 of a sixth embodiment of the invention. This image display apparatus 6 is provided with a reflection-type liquid crystal display panel 91, a light source section 92, a condenser lens 93, a PBS mirror 94, and a pancake-shaped optical element 96. The PBS mirror 94 is designed to transmit P-polarized light and reflect S-polarized light. The liquid crystal display panel 91 is so controlled that the polarized light component whose polarization plane has been rotated through 90° conveys the image.

Out of the illumination light coming from the light source section 92, the polarized light component that is S-polarized with respect to the PBS mirror 94 is reflected therefrom so as to be directed to the condenser lens 93. The condenser lens 93 forms this light into a substantially parallel beam and directs it to the liquid crystal display panel 91. The light modulated by and reflected from the liquid crystal display panel 91 passes through the condenser lens 93, and then strikes the PBS mirror 94. Here, out of the light striking the PBS mirror 94, only the polarized light component conveying the image is transmitted therethrough so as to enter the optical element 96.

The optical element 96 has, on the side thereof facing the PBS mirror 94, a convex surface 97 that is formed into a half mirror. The optical element 96 has, on the other side thereof, a concave surface 98 that has a cholesteric liquid crystal layer formed thereon and that is thereby formed into a selectively reflecting surface. One half of the light striking the optical element 96 is transmitted through the surface 97, and then, as a somewhat convergent beam, strikes the surface 98. This light is reflected from the surface 98 so as to strike the surface 97 again, which reflects one half of this light. The light reflected from the surface 97 then, as a more convergent beam, passes through the surface 98, and then reaches the observer's pupil EP.

In the image display apparatus 6, the two surfaces 97 and 98 constitute an observation optical system. Of these surfaces, the surface 97 is formed into a concave mirror having a positive power. Despite its very simple construction as described above, the image display apparatus 6 presents clear images to the observer with high brightness, high resolution, and a wide angle of view.

Obviously, many modifications and variations of the present invention are possible in light of the above teachings. It is therefore to be understood that within the scope of the appended claims, the invention may be practiced other than as specifically described.

TABLE 1

| Surface (ref. num.) | Medium | Radius of curvature (r) | |
|---|---|---|---|
| 1(EP) | air | ∞ | |
| 2(21) | PMMA | 80.873 | Rotation-symmetric aspherical surface<br>K = 0.00000<br>A = 0.38816 × $10^{-5}$   B = 0.15203 × $10^{-6}$<br>C = −0.25225 × $10^{-8}$   D = 0.00000<br>E = 0.00000   F = 0.00000 |
| 3(20) | PMMA | −41.753 | Rotation-symmetric aspherical surface<br>K = 0.00000<br>A = 0.43518 × $10^{-6}$   B = 0.11288 × $10^{-7}$<br>C = −0.40227 × $10^{-10}$   D = 0.00000<br>E = 0.00000   F = 0.00000 |
| 4(16) | PMMA | ∞ | |
| 5(19) | air | −35.000 | |
| 6(11) | air | ∞ | |
| 7(19) | PMMA | −35.000 | |
| 8(17) | air | ∞ | |

TABLE 2

| Surface (ref. num.) | XSC | YSC | ZSC | ASC | BSC | CSC |
|---|---|---|---|---|---|---|
| 1(EP) | 0.000 | 0.000 | 0.000 | 0.00 | 0.00 | 0.00 |
| 2(21) | 0.000 | 0.000 | 12.000 | 0.00 | 0.00 | 0.00 |
| 3(20) | 0.000 | 0.000 | 28.000 | 0.00 | 0.00 | 0.00 |
| 4(16) | 0.000 | 0.000 | 19.000 | 45.00 | 0.00 | 0.00 |
| 5(19) | 0.000 | 9.500 | 19.000 | 90.00 | 0.00 | 0.00 |
| 6(11) | 0.000 | 9.928 | 19.000 | 90.00 | 0.00 | 0.00 |
| 7(19) | 0.000 | 9.500 | 19.000 | 90.00 | 0.00 | 0.00 |
| 8(17) | 0.000 | −8.500 | 19.000 | 90.00 | 0.00 | 0.00 |

TABLE 3

| Surface (ref. num.) | Medium | Radius of curvature (r) | |
|---|---|---|---|
| 1(EP) | air | ∞ | |
| 2(68) | PMMA | 11056.404 | Anamorphic aspherical surface<br>KY = 0.00000   KX = 0.00000   RDX = −341.841<br>AR = −0.48685 × $10^{-5}$   AP = −0.42123 |

TABLE 3-continued

| Surface (ref. num.) | Medium | Radius of curvature (r) | |
|---|---|---|---|
| | | | BR = 0.12906 × 10⁻⁸   BP = −0.53675 |
| | | | CR = −0.18820 × 10⁻⁹   CP = −0.47382 |
| | | | DR = 0.00000   DP = 0.00000 |
| 3(69) | PMMA | −66.184 | Anamorphic aspherical surface |
| | | | KY = 23.380  KX = 22.127  RDX = −56.191 |
| | | | AR = 0.17262 × 10⁻⁴   AP = −0.82697 × 10⁻¹ |
| | | | BR = −0.26953 × 10⁻⁶   BP = −0.93029 × 10⁻² |
| | | | CR = 0.49031 × 10⁻⁸   CP = 0.27642 × 10⁻² |
| | | | DR = −0.27125 × 10⁻¹⁰   DP = 0.19650 × 10⁻¹ |
| 4(68) | PMMA | 11056.404 | Anamorphic aspherical surface |
| | | | KY = 0.00000  KX = 0.00000  RDX = −341.841 |
| | | | AR = −0.48685 × 10⁻⁵   AP = −0.42123 |
| | | | BR = 0.12906 × 10⁻⁸   BP = −0.53675 |
| | | | CR = −0.18820 × 10⁻⁹   CP = −0.47382 |
| | | | DR = 0.00000   DP = 0.00000 |
| 5(67) | air | 99.987 | Anamorphic aspherical surface |
| | | | KY = 0.00000  KX = 0.00000  RDX = 100.000 |
| | | | AR = −0.17224 × 10⁻⁶   AP = −0.51982 × 10⁺¹ |
| | | | BR = 0.32767 × 10⁻⁶   BP = 0.25372 × 10⁻¹ |
| | | | CR = 0.10800 × 10⁻⁸   CP = −0.10101 × 10⁺¹ |
| | | | DR = 0.00000   DP = 0.00000 |
| 6(65) | PMMA | 40.000 | |
| 7(64) | air | −40.000 | |
| 8(61) | air | ∞ | |
| 9(64) | PMMA | −40.000 | |
| 10(65) | air | 40.000 | |
| 11(67) | air | 99.987 | Anamorphic aspherical surface |
| | | | KY = 0.00000  KX=0.00000  RDX=100.Q00 |
| | | | AR = −0.17224 × 10⁻⁶   AP = −0.51982 × 10⁺¹ |
| | | | BR = 0.32767 × 10⁻⁶   BP = 0.25372 × 10⁻¹ |
| | | | CR = 0.10800 × 10⁻⁸   CP = −0.10101 × 10⁺¹ |
| | | | DR = 0.00000   DP = 0.00000 |
| 12(62) | air | ∞ | |

TABLE 4

| Surface (ref. num.) | XSC | YSC | ZSC | ASC | BSC | CSC |
|---|---|---|---|---|---|---|
| 1(EP) | 0.000 | 0.000 | 0.000 | 0.00 | 0.00 | 0.00 |
| 2(68) | 0.000 | 3.340 | 10.000 | 14.49 | 0.00 | 0.00 |
| 3(69) | 0.000 | 0.717 | 16.781 | −15.37 | 0.00 | 0.00 |
| 4(68) | 0.000 | 3.340 | 10.000 | 14.49 | 0.00 | 0.00 |
| 5(67) | 0.000 | 13.180 | 12.784 | 84.78 | 0.00 | 0.00 |
| 6(65) | 0.000 | 17.891 | 16.166 | 44.29 | 0.00 | 0.00 |
| 7(64) | 0.000 | 19.636 | 17.955 | 44.29 | 0.00 | 0.00 |
| 8(61) | 0.000 | 20.635 | 18.309 | 51.78 | 0.00 | 0.00 |
| 9(64) | 0.000 | 19.636 | 17.955 | 44.29 | 0.00 | 0.00 |
| 10(65) | 0.000 | 17.891 | 16.166 | 44.29 | 0.00 | 0.00 |
| 11(67) | 0.000 | 13.180 | 12.784 | 84.78 | 0.00 | 0.00 |
| 12(62) | 0.000 | 21.147 | 13.512 | 119.78 | 0.00 | 0.00 |

TABLE 5

| Surface (ref. num.) | Medium | Radius of curvature (r) | |
|---|---|---|---|
| 1(EP) | air | ∞ | |
| 2(83) | PMMA | 17.532 | Rotation-symmetric aspherical surface |
| | | | K = 0.00000 |
| | | | A = 0.74918 × 10⁻⁴   B = −0.10495 × 10⁻⁵ |
| | | | C = 0.36265 × 10⁻⁷   D = −0.56350 × 10⁻⁹ |
| | | | E = 0.29564 × 10⁻¹¹   F = 0.00000 |
| 3(79) | PMMA | −141.623 | Anamorphic aspherical surface |
| | | | KY = −0.99510  KX = 50.749  RDX = −126.067 |
| | | | AR = 0.23736 × 10⁻⁴   AP = −0.15419 |
| | | | BR = −0.16049 × 10⁻⁶   BP = −0.88362 × 10⁻¹ |
| | | | CR = 0.64822 × 10⁻⁸   CP = 0.61547 × 10⁻¹ |
| | | | DR = −0.55879 × 10⁻¹⁰   DP = 0.98922 × 10⁻¹ |
| 4(78) | PMMA | ∞ | |
| 5(80) | air | −40.000 | |
| 6(75) | PMMA | 30.000 | |
| 7(74) | air | −30.000 | |
| 8(71) | air | ∞ | |

TABLE 5-continued

| Surface (ref. num.) | Medium | Radius of curvature (r) |
|---|---|---|
| 9(74) | PMMA | −30.000 |
| 10(75) | air | 30.000 |
| 11(80) | PMMA | −40.000 |
| 12(77) | PMMA | 70.000 |
| 13(72) | air | ∞ |

TABLE 6

| Surface (ref. num.) | XSC | YSC | ZSC | ASC | BSC | CSC |
|---|---|---|---|---|---|---|
| 1(EP) | 0.000 | 0.000 | 0.000 | 0.00 | 0.00 | 0.00 |
| 2(83) | 0.000 | 0.000 | 10.000 | 0.00 | 0.00 | 0.00 |
| 3(79) | 0.000 | −0.039 | 19.000 | −13.17 | 0.00 | 0.00 |
| 4(78) | 0.000 | 1.237 | 13.547 | 25.00 | 0.00 | 0.00 |
| 5(80) | 0.000 | 17.558 | 16.171 | 74.41 | 0.00 | 0.00 |
| 6(75) | 0.000 | 17.994 | 16.293 | 74.41 | 0.00 | 0.00 |
| 7(74) | 0.000 | 20.402 | 16.965 | 74.41 | 0.00 | 0.00 |
| 8(71) | 0.000 | 20.722 | 16.931 | 71.38 | 0.00 | 0.00 |
| 9(74) | 0.000 | 20.402 | 16.965 | 74.41 | 0.00 | 0.00 |
| 10(75) | 0.000 | 17.994 | 16.293 | 74.41 | 0.00 | 0.00 |
| 11(80) | 0.000 | 17.558 | 16.171 | 74.41 | 0.00 | 0.00 |
| 12(77) | 0.000 | 12.260 | 14.693 | 34.41 | 0.00 | 0.00 |
| 13(72) | 0.000 | 17.346 | 22.118 | −0.59 | 0.00 | 0.00 |

What is claimed is:

1. An image display apparatus used in front of an observer's eye, comprising:
a reflection-type modulation device for modulating illumination light incident thereon in accordance with an image displayed thereon and reflecting back the thus modulated illumination light as image light;
a semi-transmissive reflection device for directing the illumination light to the reflection-type modulation device and letting the image light reflected back from the reflection-type modulation device emerge in a direction that is not parallel to a direction from which the semi-transmissive reflection device receives the illumination light, the semi-transmissive reflection device having at least one surface with an optical power;
an observation optical system for directing the image light to the observer's eye so that a virtual image of the image displayed on the reflection-type modulation device will be presented to the observer; and
a separation device disposed in an optical path of the image light between the reflection-type modulation device and the observer so as to separate light other than the image light from light directed to the observer's eye,
wherein the observation optical system includes a reflecting surface having an optical power.

2. An image display apparatus as claimed in claim 1, further comprising:
a light source section for supplying the illumination light.

3. An image display apparatus as claimed in claim 1, wherein the separation device is a polarization device that transmits only one of two polarized light components having mutually perpendicular polarization planes.

4. The image display apparatus of claim 1, wherein the reflection-type modulation device is a reflection-type liquid crystal display.

5. The image display apparatus of claim 1, wherein said at least one surface with an optical power is a curved surface.

6. The image display apparatus of claim 1, wherein the semi-transmissive reflection device is a semi-transmissive prism.

7. The image display apparatus of claim 6, wherein the semi-transmissive prism comprises a first prism, a second prism, and a semi-transmissive reflecting film disposed between the first and second prisms.

8. An image display apparatus used in front of an observer's eye, comprising:
a reflection-type modulation device for modulating illumination light incident thereon in accordance with an image displayed thereon and reflecting back the thus modulated illumination light as image light;
a semi-transmissive reflection device for directing the illumination light to the reflection-type modulation device and letting the image light reflected back from the reflection-type modulation device emerge in a direction that is not parallel to a direction from which the semi-transmissive reflection device receives the illumination light, the semi-transmissive reflection device having at least one surface with an optical power; and
an observation optical system for directing the image light to the observer's eye so that a virtual image of the image displayed on the reflection-type modulation device will be presented to the observer,
wherein the observation optical system includes a reflecting surface having an optical power.

9. An image display apparatus as claimed in claim 8, further comprising:
a light source section for supplying the illumination light.

10. An image display apparatus as claimed in claim 8, wherein the reflecting surface included in the observation optical system is a concave reflecting surface having a positive power.

11. The image display apparatus of claim 8, wherein the reflection-type modulation device is a reflection-type liquid crystal display.

12. The image display apparatus of claim 8, wherein said at least one surface with an optical power is a curved surface.

13. The image display apparatus of claim 8, wherein the semi-transmissive reflection device is a semi-transmissive prism.

14. The image display apparatus of claim 13, wherein the semi-transmissive prism comprises a first prism, a second prism, and a semi-transmissive reflecting film disposed between the first and second prisms.

15. The image display apparatus of claim 14, wherein the semi-transmissive reflecting film is a polarized beam separating film.

16. The image display apparatus of claim 8, wherein said reflecting surface having an optical power is provided on the semi-transmissive reflection device.

17. An image display apparatus, comprising:
a reflection-type image display;

an optical element having first, second and third surfaces, the first surface facing the reflection-type image display and the third surface being a full-reflection surface with an optical power; and a semi-transmissive reflection device disposed between the reflection-type image display and the optical element, the semi-transmissive reflection device being configured to reflect illumination light toward the reflection-type image display, wherein the first, second and third surfaces are configured such that light from the reflection-type image display passes through the first surface, then reflects from the second surface, then reflects from the third surface, and then passes through the second surface, the light from the reflection-type image display thereby being directed to a location for an observer's eye.

18. The image display apparatus of claim 17, further comprising a light source for supplying the illumination light.

19. The image display apparatus of claim 17, wherein the semi-transmissive reflection device comprises a polarized beam separating mirror.

20. The image display apparatus of claim 17, wherein the reflection-type image display is a reflection-type liquid crystal display.

21. The image display apparatus of claim 17, wherein the third surface of the optical element is a curved surface.

22. The image display apparatus of claim 21, wherein the third surface of the optical element is an aspheric surface.

23. An image display apparatus, comprising:

a reflection-type image display; and a first optical element having first, second and third surfaces, the first surface facing the reflection-type image display and being a semi-transmissive reflection surface configured to reflect illumination light toward the reflection-type image display, the third surface being a full-reflection surface with an optical power, wherein the first, second and third surfaces are configured such that light from the reflection-type image display passes through the first surface, then reflects from the second surface, then reflects from the third surface, and then passes through the second surface, the light from the reflection-type image display thereby being directed to a location for an observer's eye.

24. The image display apparatus of claim 23, further comprising a light source for supplying the illumination light.

25. The image display apparatus of claim 23, wherein the first surface of the first optical element is configured as a polarized beam separating surface.

26. The image display apparatus of claim 23, further comprising a second optical element adjoining the first surface of the first optical element and being disposed between the first optical element and the reflection-type image display, the second optical element having a surface with a positive optical power facing the reflection-type image display.

27. The image display apparatus of claim 26, further comprising a third optical element adjoining the second surface of the first optical element, the first optical element being disposed between the second and third optical elements, the third optical element having a surface with a positive optical power facing the location for an observer's eye.

28. The image display apparatus of claim 23, wherein the reflection-type image display is a reflection-type liquid crystal display.

29. The image display apparatus of claim 23, wherein the third surface of the first optical element is a curved surface.

30. The image display apparatus of claim 29, wherein the third surface of the first optical element is an aspheric surface.

31. An image display apparatus, comprising:

a reflection-type image display;

an optical element comprising a semi-transmissive convex surface and a selectively reflecting concave surface; and a semi-transmissive reflection device disposed between the reflection-type image display and the optical element, the semi-transmissive reflection device being configured to reflect illumination light toward the reflection-type image display, wherein the semi-transmissive convex surface and the selectively reflecting concave surface of the optical element are configured such that light from the reflection-type image display passes through the semi-transmissive convex surface, then reflects from selectively reflecting concave surface, then reflects from the semi-transmissive convex surface, and then passes through the selectively reflecting concave surface, the light from the reflection-type image display thereby being directed to a location for an observer's eye.

32. The image display apparatus of claim 31, wherein the semi-transmissive reflection device is a polarized beam separating mirror.

33. The image display apparatus of claim 31, wherein the semi-transmissive convex surface of the optical element is a half mirror surface.

34. The image display apparatus of claim 31, wherein the selectively reflecting concave surface of the optical element includes a cholesteric liquid crystal layer.

35. The image display apparatus of claim 31, wherein the reflection-type image display is a reflection-type liquid crystal display.

* * * * *